Patented May 22, 1945

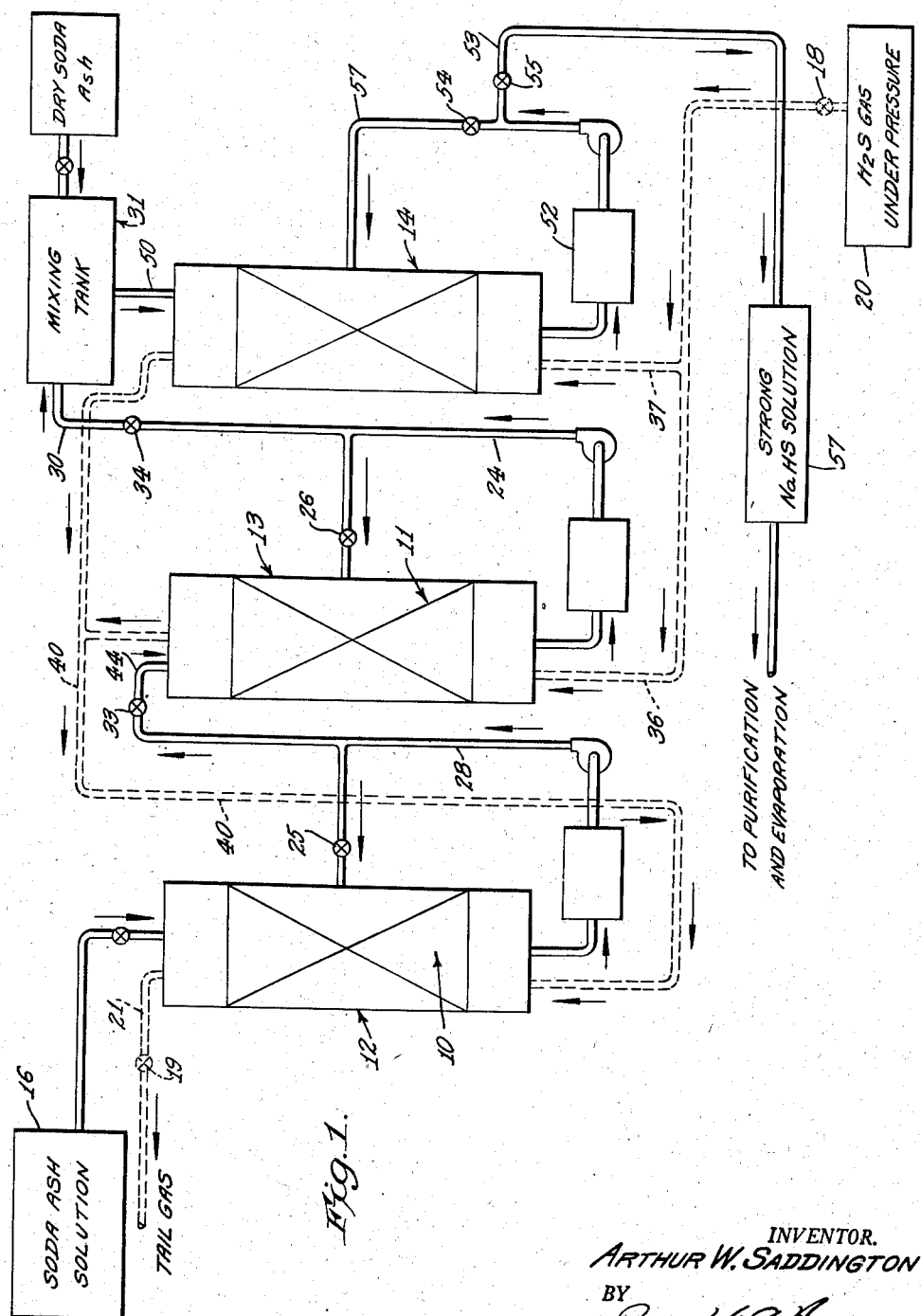

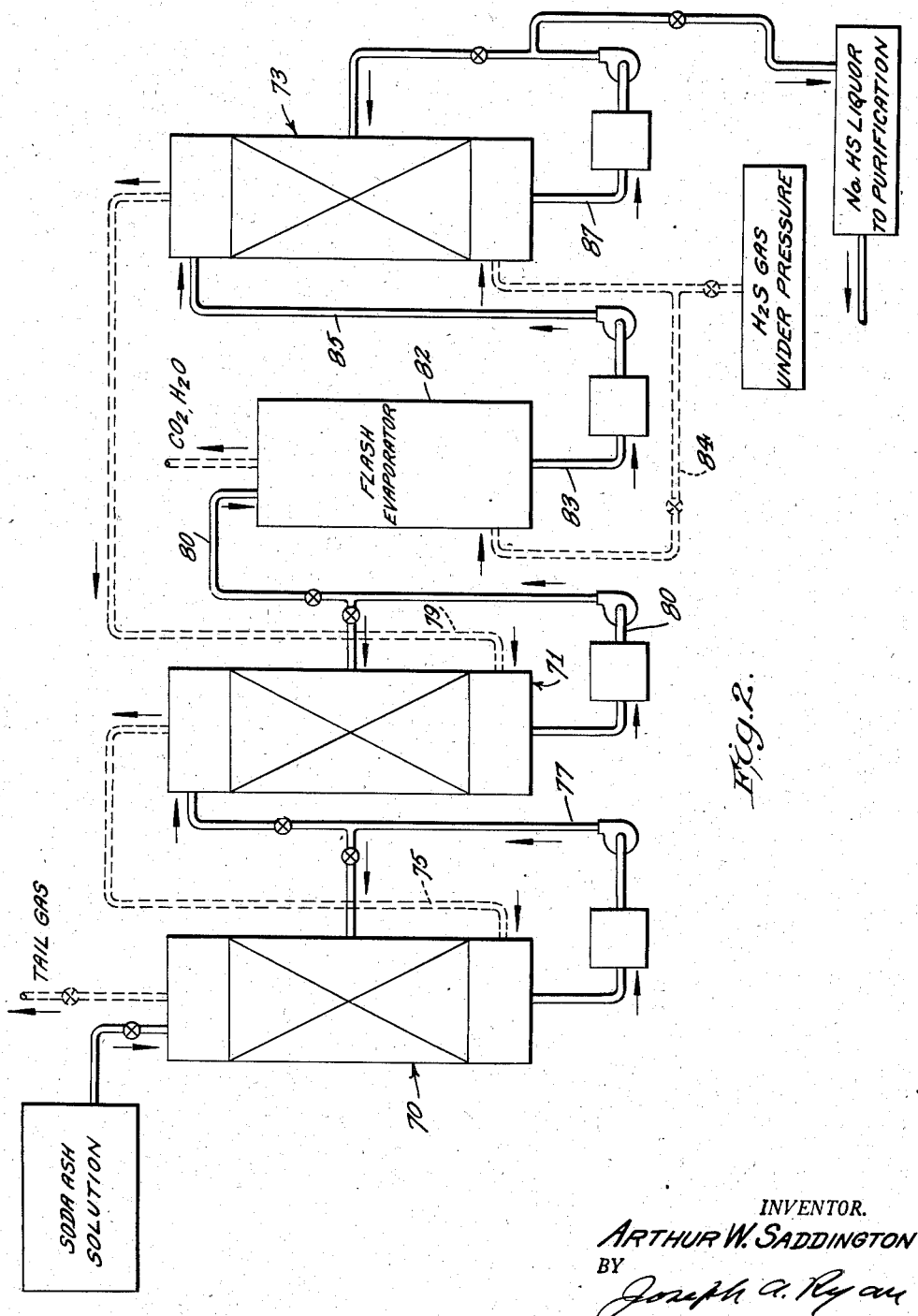

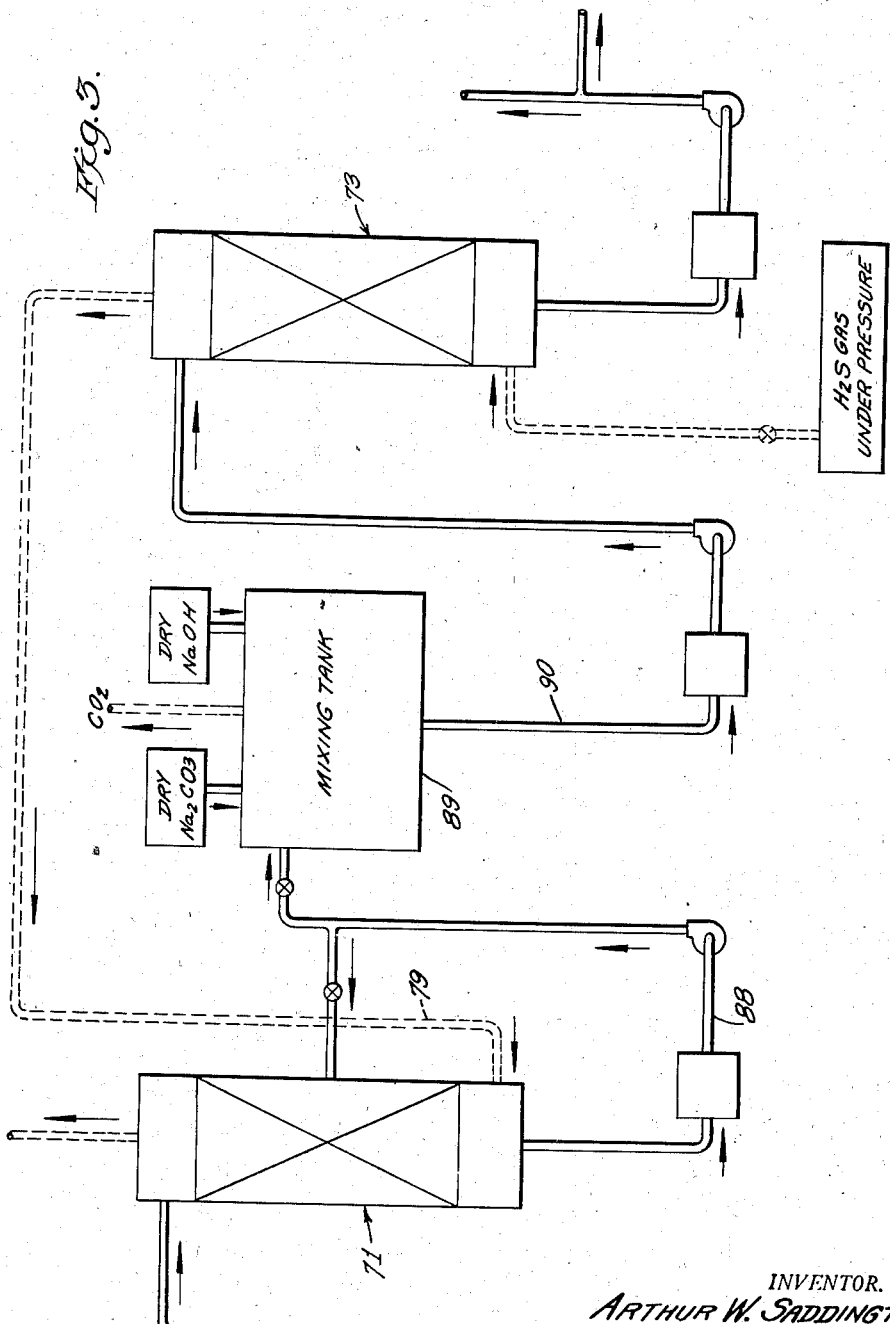

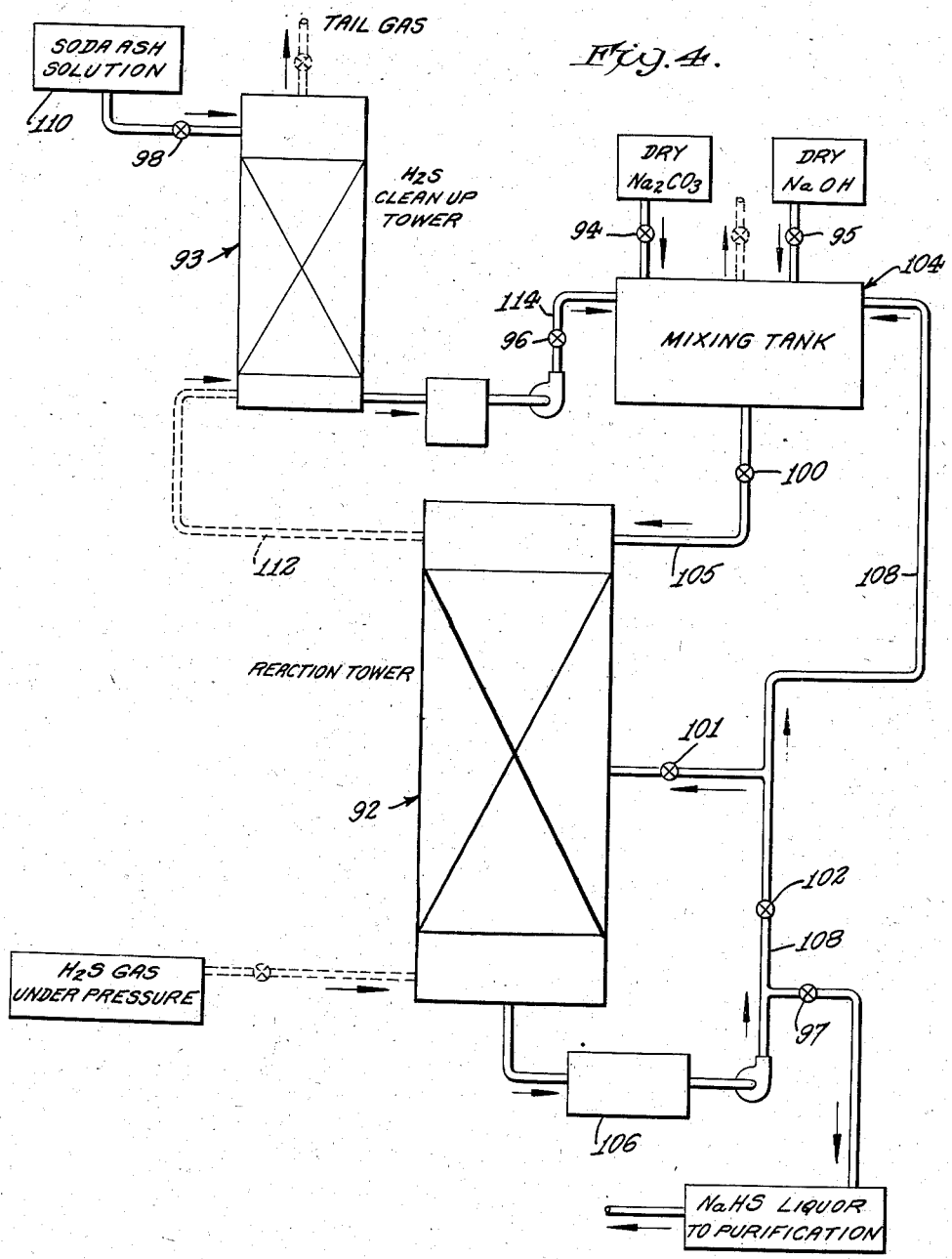

2,376,435

UNITED STATES PATENT OFFICE 2,376,435

MANUFACTURE OF SODIUM HYDROSULPHIDES

Arthur W. Saddington, Syracuse, N. Y., assignor to The Solvay Process Company, New York, N. Y., a corporation of New York Application May 30, 1944, Serial No. 538,101

15 Claims. (Cl. 23—134)

This invention relates to improvements in the manufacture of sodium hydrosulphide (NaHS) or sodium sulphide (Na₂S) or mixtures of both.

With the exception of a very small amount, all commercial grades of sodium sulphide are made from salt cake (Na₂SO₄) or nitre cake (NaHSO₄) by reduction with coal or coke at elevated temperatures. Reaction is usually carried out in reverberatory or rotary furnaces, and the furnaced material is put thru a relatively elaborate and cumbersome Na₂S recovery and purification procedure. Such process is inherently complicated and costly, and moreover results in an end product containing a substantial quantity of impurities, particularly iron. Sodium hydrosulphide may be formed by gassing sodium sulphide liquor with hydrogen sulphide. Also, sodium sulphide may be made by treating an NaHS liquor with sodium hydroxide.

It is known that sodium carbonate (Na₂CO₃) reacts with H₂S to form NaHS. Attempts have been made to produce NaHS by gassing a liquor containing sodium carbonate with hydrogen sulphide. While these proposals bring about formation of some NaHS which remains in solution, it was observed that the proportion of the sodium content of the liquor subjected to gassing which precipitated as a sodium acid carbonate (mostly Na₂CO₃.NaHCO₃.2H₂O and NaHCO₃) was so great and the loss of sodium as precipitate was so high as to render processes of such nature uneconomical. As far as known, there is no commercial production of sodium hydrosulphide or sodium sulphide by reaction of sodium carbonate and hydrogen sulphide.

A major object of this invention lies in provision of a process for making sodium hydrosulphide or sodium sulphide, of purity acceptable to the trade, using as raw materials commercial grades of soda ash (Na₂CO₃) and impure hydrogen sulphide gases which are readily available commercially. Practice of the invention involves gassing an aqueous solution containing sodium carbonate with an H₂S gas to effect reaction of Na₂CO₃ and H₂S to form NaHS. A chief object of the present improvements is provision of processes for carrying out the sodium carbonate liquor-H₂S gassing operation in such a way that there may be formed an H₂S—Na₂CO₃ reaction product liquor of high NaHS concentration. Other important features include provision of procedures by which (1) it is possible to prevent formation of carbonate containing solid phase which not only plugs up the Na₂CO₃ liquor-H₂S gas contacting apparatus but also causes heavy loss of sodium as a sodium acid carbonate of one kind or another, and (2) decomposition of sodium acid carbonate necessarily formed during H₂S gassing may be effected to such an extent that the amount of sodium acid carbonate carried in solution in the liquors in the system is held at an economical low level. Further purpose of the invention is to afford accomplishment of the foregoing objects and at the same time utilize, as a source of H₂S, commercial hydrogen sulphide gases, e. g. from petroleum refining operations, containing substantial amounts of carbon dioxide the presence of which normally tends to increase formation of sodium acid carbonate.

While it is evident that sodium acid carbonates, which are formed and exist in solution and which tend to separate out in solid phase from liquors such as handled in the invention process, include sodium sesquicarbonate Na₂CO₃.NaHCO₃.2H₂O, and decimite Na₂CO₃.3NaHCO₃, as well as a major amount of sodium bicarbonate itself, unless otherwise specified, mention of sodium bicarbonate herein is intended, for convenience, to include all sodium acid carbonates present.

The process of this invention comprises generally three major stages: first, the preparation of an NaHS liquor containing Na₂CO₃ and of certain composition with respect to NaHS and NaHCO₃ contents, and having a moderate "total sodium salt content"; second, a raising of the Na₂CO₃ concentration of such solution to bring about a corresponding increase of the "total sodium salt content" to a relatively high amount; and third, a reaction stage in which the high "total sodium salt content" liquor is gassed with H₂S under certain conditions to form a liquor of relatively high NaHS concentration. In this specification and appended claims, the expression "total sodium salt content" is used to define the sum of any or all of the sodium salts of the group consisting of the carbonate, bicarbonate, bisulphide, and sulphide of sodium.

In the course of developments of which this invention is a part, it was observed that a dependent relationship—between (1) the particular composition of an initial aqueous sodium carbonate starting liquor with respect to "total sodium salt content" and (2) the temperature and conditions of pressure at which H₂S gassing is carried out—prevents during the gassing operation formation of carbonate containing solid phase, and hastens decomposition of sodium acid carbonate formed during the process and thus minimizes the amount of sodium acid carbonate retained in the product solutions. Among other features, it was found that the aqueous sodium carbonate starting liquor should have in solution a "total sodium salt content" of not more than 21% by weight, expressed as $Na_2CO_3$.

I have discovered that if, as by the $H_2S$ gassing of an initial sodium carbonate starting solution having a "total sodium salt content" of not more than 21% by weight expressed as $Na_2CO_3$, there is formed a liquor having a "total sodium salt content" of not more than 21% by weight, and containing not less than 5% by weight of NaHS, not more than 14% of $NaHCO_3$, along with variable amounts of unreacted $Na_2CO_3$, provided the NaHS content is not permitted to become reduced below 5% and the $NaHCO_3$ content is not permitted to become increased above 14%, it is then possible to materially increase the "total sodium salt content" of such liquor, e. g. by adding extraneous $Na_2CO_3$. I find that the "total sodium salt content" of a liquor of the nature described may be increased to an amount not more than 29% by weight expressed as $Na_2CO_3$; and that, provided the hereindescribed reaction conditions such as temperature and pressure are adhered to, such a liquor may be gassed with $H_2S$ to produce a liquor having a high NaHS concentration, and at the same time formation of carbonate containing solid phase is prevented and the amount of sodium acid carbonate retained in solution in the product liquor is minimized. Viewed from another angle, I have found that an aqueous solution containing $Na_2CO_3$, not less than 5% by weight of NaHS, not more than 14% by weight of $NaHCO_3$ and having a "total sodium salt content" of preferably not less than 21% but not more than 29% by weight expressed as $Na_2CO_3$, may be gassed with $H_2S$ under the described reaction conditions without formation of carbonate containing solid phase or the presence of excessive amounts of sodium acid carbonate in the ultimate NaHS product solution. By reason of the foregoing discoveries, permitting substantial increase in the given liquor of the amount of $Na_2CO_3$ available for reaction with $H_2S$, the invention affords a marked advantage of facilitating production of reacted liquors of high NaHS concentration.

The invention will be understood more fully from the following description taken in connection with the accompanying drawings in which Fig. 1 shows diagrammatically apparatus in which a preferred embodiment of the process may be carried out, and Figs. 2, 3 and 4 show apparatus in which modified procedures may be practiced.

All modifications of the invention involve formation of aqueous solutions containing $Na_2CO_3$, not less than 5% by weight of NaHS, not more than 14% by weight of $NaHCO_3$ and having to "total sodium salt content" not more than 29% by weight, expressed as $Na_2CO_3$, and subsequently gassing such solutions with $H_2S$ gas under certain temperature and pressure conditions. These high "total sodium salt content" solutions may be made up in several satisfactory ways. In the embodiment of Fig. 1, such solutions are formed partly by preliminary $H_2S$ gassing of relatively low "total sodium salt content" starting solutions in the first two reaction zones 10 and 11 of a system including three liquor-gas contacting towers 12, 13 and 14. In this operation, the preferred starting solution is an aqueous $Na_2CO_3$ solution containing substantially no sodium salt other than $Na_2CO_3$ and having an $Na_2CO_3$ concentration of not less than 10% and not more than 21% by weight. Such a solution may be made up in tank 16 by adding the proper amount of commercial soda ash to water. The starting solution may contain some NaHS, some sodium acid carbonate, possibly some $Na_2S$, or some of any two or all three, but preferably the sodium salt present should be predominantly $Na_2CO_3$ as such, and in any case the "total sodium salt content" should not exceed 21% by weight expressed as $Na_2CO_3$. The starting solutions usually employed are water solutions of sodium carbonate having $Na_2CO_3$ concentrations of 18–20% by weight.

In all liquor-gas contacting zones in all modifications of the invention, similar temperature and pressure conditions are maintained.

In the course of $H_2S$ gassing, $Na_2CO_3$ reacts with $H_2S$ to produce NaHS and $NaHCO_3$. At certain temperature conditions, much of the $NaHCO_3$ formed may be broken down by heat to $Na_2CO_3$, $CO_2$ and water, and such $Na_2CO_3$ is made available for reaction with further $H_2S$ to make more NaHS. In conjunction with utilization of the above described starting liquors, in order to enhance reaction of $H_2S$ and sodium carbonate, to prevent formation of carbonate containing solid phase, to hasten decomposition of sodium acid carbonate and effect stripping out and discharge from the contacting zone of $CO_2$ initially combined with $Na_2CO_3$ and thus minimize the quantity of sodium acid carbonate held in solution in the liquor discharged from the contacting zone, the sodium carbonate-$H_2S$ gassing operation should be carried out while maintaining, in the contacting zone, temperature not less than 100° C. and not more than 125° C. Preferred operating temperatures are in the range of 105–115° C., and very good results have been obtained when reaction zone temperature is held at about 106–108° C. Temperatures not less than 100° C. are needed to prevent precipitation of carbonate containing solid phase, and speed up decomposition of sodium acid carbonate. While temperatures above 125° C. may be used, higher temperatures are not preferred because of greatly increased equipment corrosion.

Another condition of importance during $H_2S$ gassing is regulating the contacting operation, in reaction zones 10 and 11 so as to prevent, during reaction, increase of "total sodium salt content" of the solution to more than 21% by weight, since in this phase of the process higher "total sodium salt content" should be avoided to prevent formation of carbonate containing solid phase. Such regulation of the contacting operation is dependent upon the "total sodium salt content" of the particular starting solution used, and also upon the conditions at which any specific gassing operation is being carried out. As previously indicated, starting solutions usually employed are those having a "total sodium salt content" (preferably all $Na_2CO_3$) of the order of 18–20%. It will be seen that when utilizing such starting solutions there is not much latitude for solution concentration during $H_2S$ gassing before a "total sodium salt content" of 21% would be reached. Hence in this case, very little if any solution concentration should be permitted during $H_2S$ gassing in towers 10 and 11, and to provide for this situation, regardless of the particular reaction temperature being used, it is preferred to carry out gassing under pressure conditions such as to prevent any substantial boiling of the solution being gassed. Specific pressure to be used is dependent upon the particular temperature prevailing in the reaction zone. Solutions of the type employed for $H_2S$ gassing in accordance with the present invention have boiling point of the order of 105° C. Thus, if reaction zone temperature is say 100-103° C., it is possible to proceed at atmospheric pressure without losing enough water vapor to cause detrimental total sodium salt concentration. However, preferred reaction temperatures are 105° C. or above, and accordingly it is preferred to subject the solution being gassed to superatmospheric pressure sufficient to prevent any substantial boiling to thus avoid loss of water vapor and corresponding "total sodium salt content" concentration. Pressures up to 30 lbs. gauge may be used, pressures in the preferred temperature range of 105-115° C. being about 5-20 lbs. gauge.

When using starting solutions having "total sodium salt content" substantially less than 21% by weight, expressed as $Na_2CO_3$, it should be understood that appreciable "total sodium salt content" concentration during gassing is permissible without increasing the "total sodium salt content" of the solution to more than 21%. Thus when using relatively weak, say of the order of 15% "total sodium salt content," starting solutions, boiling of the solution undergoing gassing may be permitted until the "total sodium salt content" approaches 21%.

While the gassing operation in general may be carried out in any satisfactory liquor-gas contacting apparatus, in the modification of Fig. 1, it is preferred to effect reaction in a plurality of countercurrent towers of suitable design. The towers may be packed, e. g. with suitably sized coke or say 1 inch Raschig rings, or packing may be omitted, in which case each tower is preferably provided with baffles arranged to afford good contact of gas and liquor and controllable retarded downflow of liquor. Whatever particular type of contacting apparatus is employed, it will be understood that construction is such, whether indicated or not on the diagrammatic flow sheet, as to include for each tower the accessory equipment needed to provide for introduction of liquor into the top of a reaction zone against whatever pressure there may be therein, control of rate of feed of incoming liquor, discharge of reacted liquor, recirculation of liquor over all or part of the tower if desired, maintenance throughout the contacting zone of the indicated temperatures and whatever pressures may be needed, introduction into the reaction zone of $H_2S$ gas employed, and discharge of tail gas. Temperatures may be maintained by controlled indirect heating not shown, e. g. a heating jacket around each tower, and pressures in the system may be regulated largely by adjustment of valve 18 at the $H_2S$ gas source 20 and of valve 19 in the tail gas line 21.

In practice, the gases which may be employed include pure $H_2S$ gas, $H_2S$ gas containing diluents inert to the reaction, or an $H_2S$ gas containing a diluent such as $CO_2$ which is not inert to the reaction, i. e. $CO_2$ reacts in water solution with $Na_2CO_3$ to form $NaHCO_3$. In the case of $H_2S$ gases containing diluents inert to the reaction, $H_2S$ concentration may be any feasible value. In order to prevent a build-up of $NaHCO_3$ in the system, particularly in a continuous operation, if the $H_2S$ gas used contains $CO_2$, such incoming $H_2S$ gas should contain by volume not more $CO_2$ than $H_2S$. In all operations, it is preferred to employ gases containing not less than 50% $H_2S$ by volume, and if such gases contain $CO_2$, concentration of the latter should be not above 25% by volume, i. e. $CO_2$ content by volume is preferably not more than half the $H_2S$ content by volume. In usual operation, gases utilized comprise about 90% $H_2S$ and about 10% $CO_2$ by volume. In this specification and appended claims, unless otherwise indicated, gas compositions mentioned are intended to define compositions of the $H_2S$ gas at the point of first contact of incoming gas with intermediate or ultimate product liquor leaving any particular stage of the system, e. g. in Fig. 1, at the bottom of tower 13 or alternatively at the bottom of tower 14. The $H_2S$ employed is held at source 20 under pressure of say 30-40 lbs. gauge.

Purpose of towers 12 and 13 is to produce, in effluent liquor line 24 of tower 13, a sodium hydrosulphide liquor containing $Na_2CO_3$, not less than 5% by weight of NaHS, and not more than 14% $NaHCO_3$, preferred liquor compositions at this point being 8-14% of NaHS and not more than 10% of $NaHCO_3$. As above indicated, I find that until the NaHS and $NaHCO_3$ concentrations of the liquors in the system have been brought to the 5% and 14% values stated, total equivalent $Na_2CO_3$ content should not exceed 21% by weight. Hence, the soda ash starting solution fed into tower 12 from tank 16 should not contain more than 21% equivalent $Na_2CO_3$. Ordinarily valves 25 and 26 are closed, since necessarily there need not be any recirculation of liquor over towers 12 and 13, and liquor discharged from tower 12 is pumped thru line 29 to the top of tower 13, and the effluence liquor of tower 13 runs thru line 24 and pipe 30 into mixing tank 31, valves 33 and 34 being opened.

On Fig. 1, course of liquor and gas thru the system is indicated by solid and dotted lines respectively. When utilizing a gas containing about 90% $H_2S$ and 10% $CO_2$ by volume, such gas enters the bottom of tower 13 from pipe 36, and gas of the same $H_2S$ strength is fed into the bottom of tower 14 by conduit 37, relatively strong $H_2S$ gas thus passing in parallel thru towers 13 and 14. The exit gases of towers 13 and 14 are combined in conduit 40 and introduced into the bottom of tower 12, and the combined gas may contain from 10 to 30% $H_2S$ and from 90 to 70% $CO_2$ and possibly some relatively small amount of water vapor. By this procedure, the gas in the system having the lowest $H_2S$ concentration is contacted, in tower 12, with liquor of relatively high $Na_2CO_3$ concentration, thus providing for over-all utilization of about 95-98% of the total $H_2S$.

In tower 12, countercurrent contact of liquor and gas is regulated ordinarily to produce in line 28 a liquor containing from 3 to 7% NaHS, 10 to 15% $NaHCO_3$, and 7 to 11% $Na_2CO_3$. Since primary function of tower 12 is to afford good clean-up of $H_2S$, degree of conversion of $Na_2CO_3$ to NaHS is not critical. If desirable to build up the NaHS concentration of liquor discharged from tower 12 to say 5-8%, valve 25 may be opened and a portion of the liquor continuously recirculated. According to one example, using an aqueous starting solution containing 20% by weight of $Na_2CO_3$, and a gas from pipe 40 containing 20% $H_2S$ and 80% $CO_2$, the effluent liquor in pipe 28 may contain by weight 5% NaHS, 12% $NaHCO_3$, and 9% $Na_2CO_3$.

Partially reacted liquor formed in tower 12 is fed into the top of tower 13 thru pipe 44 and is contacted countercurrent with relatively strong $H_2S$ gas. Overall gas contacting operations in towers 12 and 13 are preferably conducted so that the effluent liquor of tower 13 in line 24 has an NaHS concentration of say 12–16% by weight, in which instance such liquor may contain from 3 to 7% $NaHCO_3$ and 3 to 6% $Na_2CO_3$. If, as is ordinarily the case, fairly high NaHS and relatively low $NaHCO_3$ concentrations are desired in line 24, valve 26 may be opened to effect recirculation thru tower 13 of any suitable amount of liquor. In the example mentioned, using a gas containing 90% $H_2S$ and 10% $CO_2$, effluent liquor of tower 13 may contain by weight 14% NaHS, 5% $NaHCO_3$, and 4% $Na_2CO_3$.

When proceeding under the temperature and pressure conditions described, loss of water in towers 12 and 13 is more or less incidental and does not bring about sufficient "total sodium salt content" concentration to give rise to difficulties in connection with formation of carbonate containing solid phase in towers 12 and 13. Hence, it will be understood that even though liquors are recirculated over towers 12 and 13, the "total sodium salt content" of the liquors in the system up to and including pipe 24 does not significantly exceed 21% by weight, expressed as $Na_2CO_3$.

Result of the foregoing operation of towers 12 and 13 is production and feed to tank 31 of liquors relatively depleted of available $Na_2CO_3$ and having NaHS concentration well above 5% by weight, and $NaHCO_3$ concentrations well below 14% by weight. In accordance with the invention, I find that, provided the NaHS content is not permitted to drop below 5% and the $NaHCO_3$ content is not permitted to exceed 14%, the "total sodium salt content" of the liquor may be increased to 29% by weight, expressed as $Na_2CO_3$, and the resulting liquor may be gassed further with $H_2S$ to form a reacted liquor having a high NaHS concentration.

While raising $Na_2CO_3$ concentration and increasing "total sodium salt content" of the liquor may be effected in more than one way, it is preferred to accomplish this end by introduction into the system of extraneous $Na_2CO_3$. Additional $Na_2CO_3$ is supplied preferably as dry soda ash, although such $Na_2CO_3$ may be introduced in the form of strong solutions or slurries having an $Na_2CO_3$ concentration as much in excess of 29% by weight as feasible. When "total sodium salt content" is increased by addition of extraneous $Na_2CO_3$, there is some decrease of the $NaHCO_3$ and NaHS contents in the resulting liquor. Accordingly, to prevent drop of NaHS content below 5% during addition of the extraneous $Na_2CO_3$, towers 12 and 13 are usually operated to produce an intermediate liquor of such NaHS strength above 5% that during addition of extraneous $Na_2CO_3$, the NaHS content of the resulting liquor is not reduced below 5%. It will be understood that whatever the total of all sodium materials fed into tank 31 may be, the gassing operation in towers 12 and 13 and the mixing in tank 31 are regulated so that the liquor fed into the top of tower 14 thru pipe 50 contains not less than 5% by weight of NaHS, not more than 14% by weight of $NaHCO_3$, and has a "total sodium salt content" not more than 29% and preferably more than 21% by weight. In the example under consideration, the quantity of dry soda ash used may be such as to form in tank 31 a liquor containing by weight 12% NaHS, 4% $NaHCO_3$, and 15% $Na_2CO_3$.

Operation of tower 14 is the same as that of towers 12 and 13 except in tower 14 the contacting operation is regulated so as to prevent increase of "total sodium salt content" of the solution undergoing gassing to more than 29%. If the solution fed to tower 14 contains say 27–28% "total sodium salt content," pressure should be such as to prevent appreciable boiling. On the other hand, if the solution in pipe 51 has a substantially lower "total sodium salt content," e. g. 23–24%, boiling is permissible until "total sodium salt content" approaches 27–28%.

Design of tower 14 and rates of feed of liquor and $H_2S$ gas thereto may be such as to produce in pump tank 52 a reacted liquor containing NaHS from 18 to 23%, $Na_2CO_3$ from 3 to 6%, and $NaHCO_3$ from 2 to 5%. Where it is desired to take off from pipe 53 a liquor having the highest feasible NaHS concentration, it may be desirable to recirculate thru tower 14 part of the liquor from tank 52, in which case valves 54 and 55 are suitably adjusted. In the example given, the liquor in tank 52 may contain by weight 23% NaHS, 2% $NaHCO_3$, and 4% $Na_2CO_3$.

As indicated, the reacted liquors in line 53 contain appreciable quantities of sodium acid carbonate and sodium carbonate, $Na_2CO_3$. Liquors of this type cannot be concentrated by the usual evaporation methods in the presence of sodium acid carbonate, without loss of NaHS, since it appears that on heating, sodium acid carbonate causes decomposition of NaHS with resultant formation of $Na_2CO_3$ and $H_2S$. Hence, sodium acid carbonate should be removed substantially completely from the reacted liquor in any suitable way. This may be accomplished, for example, by treating liquor from tank 57 with caustic soda, resulting in conversion of sodium acid carbonate to $Na_2CO_3$ and water. Following substantial elimination of sodium acid carbonate, the liquor may be concentrated as desired to strength of about 50% NaHS in an evaporator not shown. During such concentration, which may be effected by heating the liquor at atmospheric pressure to about 150° C., most of the $Na_2CO_3$ precipitates, settles out and may be removed by filtration. The resulting relatively strong NaHS filtrate ordinarily contains in solution about 0.2–0.3% $Na_2CO_3$ in solution, which residual $Na_2CO_3$ may be removed in any suitable way if a substantially pure NaHS end product is desired. If the end product desired is $Na_2S$, the NaHS liquor may be treated with NaOH to convert all or any portion of the NaHS to $Na_2S$. Alternatively, NaHS or $Na_2S$ may be produced in solid form by evaporation of the liquors and solidification by known methods. $Na_2CO_3$ by-product may be returned to the process.

Increase of "total sodium salt content" to not more than 29% by weight may be accomplished by removing water from the system as in the modification of Fig. 2. Towers 70, 71 and 73 are constructed the same as and operated similarly to towers 12, 13 and 14 of Fig. 1. This embodiment also shows operation in situations in which the gas fed into the bottom of tower 71 has relatively low $H_2S$ and fairly high $CO_2$ concentrations as in cases where the apparatus arrangement is such that the $H_2S$ gas passes in series thru towers 73, 71 and 70 in the order named.

When using a 20% by weight soda ash water solution and introducing into the bottom of tower 70 from line 75 a gas containing 10% $H_2S$ and 90% $CO_2$, there may be produced in pipe 77 an effluent liquor containing by weight 3% NaHS, 13% $NaHCO_3$, and 9% $Na_2CO_3$. When this liquor is treated in tower 71 with a gas from pipe 79 containing 50% $H_2S$ and 50% $CO_2$, there may be formed in pipe 80 an effluent liquor having a "total sodium salt content" of about 20–21% by weight, expressed as $Na_2CO_3$, and containing by weight 9% NaHS, 9% $NaHCO_3$, 6% $Na_2CO_3$. Such liquor contains more than 5% NaHS and less than 14% $NaHCO_3$, and hence is of composition which permits increasing the "total sodium salt content" prior to further gassing with $H_2S$.

In accordance with this modification, raising of the "total sodium salt content" is had by evaporation and concentration of the effluent liquor of tower 71, and to this end the liquor in pipe 80 is sprayed into the top of flash evaporator 82, overall purpose of which is to drive water out of the system and increase "total sodium salt content" up to not more than 29%. The evaporator is constructed to operate at atmospheric or preferably lower pressure, and is provided with external heating means not shown designed to maintain temperatures about the same as the temperatures existing in towers 70, 71 and 73. Ordinarily, if an NaHS liquor containing $NaHCO_3$ is heated at temperatures of the order of 100–125° C., $NaHCO_3$ reacts with NaHS with formation of $Na_2CO_3$ and $H_2S$. Hence, if precautions are not taken to offset NaHS decomposition in the evaporating step, the NaHS content of the liquor might fall below 5%, and an appreciable amount of $H_2S$ would be lost in the gas-vapor exit of the evaporator. To overcome this difficulty, during evaporation, a quantity of gas containing e. g. 90% $H_2S$ and 10% $CO_2$ from pipe 84 is fed into the evaporator. The quantity of $H_2S$ introduced is such, under the particular conditions of operation, to maintain a pressure of $H_2S$ in the gas phase at least equal to and preferably in excess of the $H_2S$ partial pressure of the solution. In any particular operation the quantity of $H_2S$ used may be gauged by the composition of the gas-vapor exit of the evaporator, admission of $H_2S$ being so controlled that the gas-vapor exit contains substantially no $H_2S$.

Result of the evaporator operation is removal of water from the system, prevention of decomposition of NaHS, increase of NaHS and $Na_2CO_3$ contents of the liquor, and a substantial decrease of the $NaHCO_3$ content of the liquor which decrease is caused by the decomposition of $NaHCO_3$ to $Na_2CO_3$. Liquor retention time depends largely upon the design of the evaporator and upon the "total sodium salt content" of the liquor charged thereto. If desired, the evaporator may be of tower-like construction and be provided with liquor recirculating means. In any case, retention time is regulated so that "total sodium salt content" of the liquor is raised to not more than 29%. In the case of introduction into evaporator 82 of a liquor of the composition indicated in pipe 80, and adjusting the amount of $H_2S$ introduced so that the gas-vapor exit contains substantially no $H_2S$, the liquor leaving thru pipe 83 may contain by weight 12% NaHS, 3% $NaHCO_3$, 14% $Na_2CO_3$ and have a "total sodium salt content" of about 27% by weight, expressed as $Na_2CO_3$. Such liquor is then run thru pipe 85 into the top of tower 73, treated with 90% $H_2S$-10% $CO_2$ gas as previously described, and product liquor leaving tower 73 thru pipe 87 may contain by weight 20% NaHS, 2% $NaHCO_3$, 7% $Na_2CO_3$, and have a "total sodium salt content" of about 27% by weight.

In the embodiment of Fig. 3, the gas entering the bottom of tower 71 from pipe 79 may contain 50% $H_2S$ and 50% $CO_2$, and operation of tower 71 may be such as to produce in pipe 88 an effluent liquor containing by weight 9% NaHS, 9% $NaHCO_3$, 6% $Na_2CO_3$ and having a "total sodium salt content" of about 20% by weight, i. e. operation of tower 71 of Fig. 3 being the same as the operation of tower 71 of Fig. 2. However, in the process of Fig. 3, the "total sodium salt content" of the intermediate product liquor is increased partly by sodium brought in as NaOH, and partly by sodium brought in as $Na_2CO_3$, both being introduced preferably in dry form. NaOH reacts with $NaHCO_3$ to form $Na_2CO_3$ and liberate $CO_2$. The quantity of NaOH used is preferably not more than that needed to react with the $NaHCO_3$ present, thus avoiding undesirable reaction of NaOH and NaHS which might reduce NaHS content to less than 5%. Taking into account the quantity of sodium fed into tank 89 as NaOH, the quantity of dry $Na_2CO_3$ fed in is regulated so that the effluent liquor in pipe 90 has a "total sodium salt content," e. g. 27–28%, not more than 29%. Operation of tank 89 is such that the liquor in pipe 90 may contain by weight 9% NaHS, 3% $NaHCO_3$, 17% $Na_2CO_3$, and have a "total sodium salt content" of about 27% by weight, expressed as $Na_2CO_3$. Such liquor is then treated in tower 73 of Fig. 3 with gas containing 90% $H_2S$ and 10% $CO_2$ to form a product liquor of composition similar to the effluent liquor of tower 73 of Fig. 2.

In the modification of Fig. 4, the major portion of NaHS liquor production is effected in a single reaction tower 92 normally functioning in conjunction with a relatively small $H_2S$ clean-up tower 93. In starting up operations, valves 94, 95, 96, 97 and 98 are closed, and valves 100, 101 and 102 are opened. The system including mix tank 104, pipe 105, tower 92, pump tank 106 and return pipe 108 is filled with a starting solution similar to that of tank 16 of Fig. 1, e. g. a water solution containing about 20% by weight of $Na_2CO_3$. This solution is treated in tower 92 with a gas containing say 90% $H_2S$ and 10% $CO_2$, under the previously described temperature and pressure conditions. Such gassing is continued until the liquor circulating thru tank 104 and tower 92, having a "total sodium salt content" of about 20–21% by weight, contains not less than 5% by weight NaHS and not more than 14% by weight $NaHCO_3$, and ordinarily until such liquor contains by weight 8–14% NaHS and not more than 10% $NaHCO_3$. "Total sodium salt content" may be then raised to an amount not more than 29% by weight, and for this purpose a suitable quantity of preferably dry $Na_2CO_3$ or NaOH or some of both is introduced into tank 104. If NaOH is employed, the quantity used is preferably not more than that needed to react with the $NaHCO_3$ present in order to avoid undesirable reaction of NaOH and NaHS. Valves 94 and 95 are then closed, and the liquor is gassed in tower 92 and recirculated thru tower 92 and tank 104 until the NaHS concentration has been increased to a good operating maximum, say 20–23% by weight. Tank 110 contains a starting liquor consisting preferably of a water solution of about 20% by weight $Na_2CO_3$ concentration. During the foregoing preliminary gassing, any $H_2S$ leaving the top of tower 92 and entering the bottom of tower 93 by pipe 112 may be recovered by countercurrent contact in tower 93 with starting solution from tank 110, the resulting effluent of tower 93 being temporarily stored in apparatus not shown.

With valves 96, 97 and 98 open, and say valve 95 partly open, the normal production operation may be initiated. Part of the high NaHS concentration product liquor is drawn off thru valve 97, and an equal volume of starting solution is fed into the top of tower 93 from tank 110. When introducing into the bottom of tower 92 a gas containing about 90% $H_2S$ and 10% $CO_2$, the gas discharged from tower 92 into pipe 112 ordinarily contains about 10% $H_2S$ and 90% $CO_2$. With a weak gas of this nature entering tower 93, the liquor effluent in pipe 114 is rather low in NaHS, and relatively high with respect to $NaHCO_3$ content, and the composition of such liquor may be of the order of 2 to 6% NaHS, 10 to 15% $NaHCO_3$, and 7 to 12% $Na_2CO_3$, by weight. It will be understood that the temperature and pressure conditions maintained in tower 93 are the same as in tower 92. Accordingly, the "total sodium salt content" of liquor in pipe 114 is not increased and is held to about 20–21% by weight, expressed as $Na_2CO_3$.

Product liquor in pipe 108 may contain by weight 23% NaHS, 2% $NaHCO_3$, 5% $Na_2CO_3$, and may have a "total sodium salt content" of about 27–28% by weight. Liquors from pipes 108 and 114 are continuously fed into tank 104, and the quantity of product liquor run into tank 104 from pipe 108, which product liquor is always relatively high in NaHS and low in $NaHCO_3$, should be sufficient to form in tank 104 a liquor mixture containing not more than 14% $NaHCO_3$ and an amount of NaHS such that when extraneous $Na_2CO_3$ or NaOH is subsequently introduced, the NaHS content of the liquor does not drop below 5%, and preferably not below 8%. Since the "total sodium salt content" of the liquor in pipe 114 is less than that of the liquor in pipe 108, it will be understood that normally the "total sodium salt content" of the liquor in tank 104 would be decreased and be substantially less than the preferred 27–28%. Hence, enough extraneous sodium (in the form of NaOH or $Na_2CO_3$ or both) is continuously introduced into tank 104 to maintain the "total sodium salt content" of the liquor in tank 104 at about 27–28% by weight, expressed as $Na_2CO_3$. When proceeding in this manner, there is fed to the top of tower 92 a liquor which may contain by weight 10% NaHS, 1% $NaHCO_3$, 16% $Na_2CO_3$, and have a "total sodium salt content" of about 28% by weight. Under some conditions of operation, the $NaHCO_3$ content of the liquor in line 114 might be high enough to cause the $NaHCO_3$ content of the composite liquor in tank 104 to approach too closely the indicated maximum of 14%. In such circumstance, sufficient NaOH should be used to keep the $NaHCO_3$ content of the liquor in tank 104 at a convenient operating point below 14%.

Thus, normal practice of the embodiment of Fig. 4 involves continuous formation in tank 104 of a composite liquor containing a relatively large quantity of $Na_2CO_3$ available for reaction with $H_2S$ to form sodium hydrosulphide, not less than 5% by weight of NaHS (preferably not less than 8% by weight NaHS), not more than 14% by weight $NaHCO_3$ (preferably not more than 10% by weight $NaHCO_3$) and having a "total sodium salt content" not less than 21% and not more than 29% by weight, expressed as $Na_2CO_3$. By proceeding as indicated, a reacted liquor having the highest feasible maximum concentration of NaHS may be continuously drawn out of the system thru valve 97.

In the appended claims, reference to percent of "total sodium salt content" is intended to define "total sodium salt content" in terms of percent by weight expressed as $Na_2CO_3$.

Two copending applications, of Julien and Terziev, Serial No. 522,794, and Charles L. Koenig, Serial No. 527,143, both assigned to the same common assignee as this application and both directed to subject matter related to this application, were filed on February 17, 1944, and March 18, 1944, respectively.

I claim:

1. The method for producing sodium hydrosulphide which comprises forming an aqueous solution containing $Na_2CO_3$, not less than 5% by weight of NaHS, not more than 14% by weight of $NaHCO_3$, and having a "total sodium salt content" not less than 21% and not more than 29% by weight, contacting said solution with gas containing $H_2S$ and an amount of $CO_2$ ranging from none to a volume equal to the volume of the $H_2S$ content of said gas, and maintaining, during said contacting operation, temperature not less than 100° C., and pressure conditions such as to prevent any substantial boiling of said solution, thereby forming relatively concentrated sodium hydrosulphide solution.

2. The method for producing sodium hydrosulphide which comprises forming an aqueous solution containing $Na_2CO_3$, not less than 8% by weight of NaHS, not more than 10% by weight of $NaHCO_3$, and having a "total sodium salt content" not less than 21% and not more than 29% by weight, contacting said solution with gas containing $H_2S$ and an amount of $CO_2$ ranging from none to a volume equal to the volume of the $H_2S$ content of said gas, and maintaining, during said contacting operation, temperature not less than 100° C., and pressure conditions such as to prevent any substantial boiling of said solution, thereby forming relatively concentrated sodium hydrosulphide solution.

3. The method for producing sodium hydrosulphide which comprises forming an aqueous solution containing $Na_2CO_3$, not less than 5% by weight of NaHS, not more than 14% by weight of $NaHCO_3$, and having a "total sodium salt content" not less than 21% and not more than 29% by weight, contacting said solution with gas containing $H_2S$ and an amount of $CO_2$ ranging from none to a volume equal to the volume of the $H_2S$ content of said gas, and maintaining, during said contacting operation, temperature not less than 100° C. and not more than 125° C. and pressure conditions such as to prevent any substantial boiling of said solution, thereby forming relatively concentrated sodium hydrosulphide solution.

4. The method for producing sodium hydrosulphide which comprises forming an aqueous solution containing $Na_2CO_3$, not less than 5% by weight of NaHS, not more than 14% by weight of $NaHCO_3$, and having a "total sodium salt content" not less than 21% and not more than 29% by weight, contacting said solution with gas containing $H_2S$ and an amount of $CO_2$ ranging from none to a volume equal to the volume of the $H_2S$ content of said gas while maintaining temperature not less than 100° C., and regulating the contacting operation so as to prevent, during the course thereof, increase of "total sodium salt content" of the solution undergoing $H_2S$ gassing to more than 29% by weight, thereby forming relatively concentrated sodium hydrosulphide solution.

5. The method for producing sodium hydrosulphide which comprises forming an aqueous solution containing $Na_2CO_3$, not less than 8% by weight of NaHS, not more than 10% by weight of NaHCO$_3$, and having a "total sodium salt content" not less than 21% and not more than 29% by weight, contacting said solution with gas containing H$_2$S and an amount of CO$_2$ ranging from none to a volume equal to the volume of the H$_2$S content of said gas while maintaining temperature not less than 100° C., and regulating the contacting operation so as to prevent, during the course thereof, increase of "total sodium salt content" of the solution undergoing H$_2$S gassing to more than 29% by weight, thereby forming relatively concentrated sodium hydrosulphide solution.

6. The method for producing sodium hydrosulphide which comprises forming an aqueous solution containing Na$_2$CO$_3$, not less than 5% by weight of NaHS, not more than 14% by weight of NaHCO$_3$, and having a "total sodium salt content" not less than 21% and not more than 29% by weight, contacting said solution with gas containing H$_2$S and an amount of CO$_2$ ranging from none to a volume equal to half the volume of the H$_2$S content of said gas, and maintaining temperature not less than 100° C. and not more than 125° C. and pressure conditions such as to prevent increase of "total sodium salt content" of the solution undergoing H$_2$S gassing to more than 29% by weight, thereby forming relatively concentrated sodium hydrosulphide solution.

7. The method for producing sodium hydrosulphide which comprises forming an aqueous solution containing Na$_2$CO$_3$, not less than 5% by weight of NaHS, not more than 14% by weight of NaHCO$_3$, and having a "total sodium salt content" not more than 21% by weight, increasing the "total sodium salt content" to not more than 29% by weight while maintaining NaHS content of the solution not less than 5% and NaHCO$_3$ content not more than 14% by weight, contacting the resulting solution with gas containing H$_2$S and an amount of CO$_2$ ranging from none to a volume equal to the volume of the H$_2$S content of said gas while maintaining temperature not less than 100° C., and regulating the contacting operation so as to prevent, during the course thereof, increase of "total sodium salt content" of the solution undergoing H$_2$S gassing to more than 29% by weight, thereby forming relatively concentrated sodium hydrosulphide solution.

8. The method for producing sodium hydrosulphide which comprises forming an aqueous solution containing Na$_2$CO$_3$, not less than 5% by weight of NaHS, not more than 14% by weight of NaHCO$_3$, and having a "total sodium salt content" not more than 21% by weight, raising the Na$_2$CO$_3$ concentration of said solution and increasing the "total sodium salt content" thereof to not more than 29% by weight while maintaining NaHS content of the solution not less than 5% and NaHCO$_3$ content not more than 14% by weight, contacting the resulting solution with gas containing H$_2$S and an amount of CO$_2$ ranging from none to a volume equal to the volume of the H$_2$S content of said gas while maintaining temperature not less than 100° C., and regulating the contacting operation so as to prevent, during the course thereof, increase of "total sodium salt content" of the solution undergoing H$_2$S gassing to more than 29% by weight, thereby forming relatively concentrated sodium hydrosulphide solution.

9. The method for producing sodium hydrosulphide which comprises forming an aqueous solution containing Na$_2$CO$_3$, not less than 5% by weight of NaHS, not more than 14% by weight of NaHCO$_3$, and having a "total sodium salt content" not more than 21% by weight, adding extraneous Na$_2$CO$_3$ to said solution to increase the "total sodium salt content" thereof to not more than 29% by weight while maintaining NaHS content of the solution not less than 5% and NaHCO$_3$ content not more than 14% by weight, contacting the resulting solution with gas containing H$_2$S and an amount of CO$_2$ ranging from none to a volume equal to the volume of the H$_2$S content of said gas while maintaining temperature not less than 100° C., and regulating the contacting operation so as to prevent, during the course thereof, increase of "total sodium salt content" of the solution undergoing H$_2$S gassing to more than 29% by weight, thereby forming relatively concentrated sodium hydrosulphide solution.

10. The method for producing sodium hydrosulphide which comprises forming an aqueous solution containing Na$_2$CO$_3$, not less than 5% by weight of NaHS, not more than 14% by weight of NaHCO$_3$, and having a "total sodium salt content" not more than 21% by weight, adding dry Na$_2$CO$_3$ to said solution to increase the "total sodium salt content" thereof to not more than 29% by weight while maintaining NaHS content of the solution not less than 5% and NaHCO$_3$ content not more than 14% by weight, contacting the resulting solution with gas containing H$_2$S and an amount of CO$_2$ ranging from none to a volume equal to the volume of the H$_2$S content of said gas while maintaining temperature not less than 100° C., and regulating the contacting operation so as to prevent, during the course thereof, increase of "total sodium salt content" of the solution undergoing H$_2$S gassing to more than 29% by weight, thereby forming relatively concentrated sodium hydrosulphide solution.

11. The method for producing sodium hydrosulphide which comprises forming an aqueous solution containing Na$_2$CO$_3$, not less than 8% by weight of NaHS, not more than 10% by weight of NaHCO$_3$, and having a "total sodium salt content" not more than 21% by weight, adding dry Na$_2$CO$_3$ to said solution to increase the "total sodium salt content" thereof to not more than 29% by weight while maintaining NaHS content of the solution not less than 8% and NaHCO$_3$ content not more than 10% by weight, contacting the resulting solution with gas containing H$_2$S and an amount of CO$_2$ ranging from none to a volume equal to half the volume of the H$_2$S content of said gas, and maintaining, during said contacting operation, temperature not less than 100° C. and not more than 125° C. and pressure conditions such as to prevent any substantial boiling of said solution, thereby forming relatively concentrated sodium hydrosulphide solution.

12. The method for producing sodium hydrosulphide which comprises forming an aqueous solution containing Na$_2$CO$_3$, not less than 5% by weight of NaHS, not more than 14% by weight of NaHCO$_3$, and having a "total sodium salt content" not more than 21% by weight, evaporating the solution to increase the "total sodium salt content" thereof to not more than 29% by weight, said evaporation operation being carried out in the presence of sufficient extraneous H$_2$S to maintain a pressure of gas phase H$_2$S at least equal to the H$_2$S partial pressure of the solution, contacting the resulting solution with gas containing H$_2$S and an amount of CO$_2$ ranging from none to a volume equal to the volume of the $H_2S$ content of said gas while maintaining temperature not less than 100° C., and regulating the contacting operation so as to prevent, during the course thereof, increase of "total sodium salt content" of the solution undergoing $H_2S$ gassing to more than 29% by weight, thereby forming relatively concentrated sodium hydrosulphide solution.

13. The method for producing sodium hydrosulphide which comprises forming an aqueous solution containing $Na_2CO_3$, not less than 8% by weight of NaHS, not more than 10% by weight of $NaHCO_3$, and having a "total sodium salt content" not more than 21% by weight, evaporating the solution to increase the "total sodium salt content" thereof to not more than 29% by weight, said evaporation operation being carried out in the presence of sufficient extraneous $H_2S$ to maintain a pressure of gas phase $H_2S$ at least equal to the $H_2S$ partial pressure of the solution, contacting the resulting solution with gas containing $H_2S$ and an amount of $CO_2$ ranging from none to a volume equal to half the volume of the $H_2S$ content of said gas, and maintaining, during said contacting operation, temperature not less than 100° C. and not more than 125° C. and pressure conditions such as to prevent any substantial boiling of said solution, thereby forming relatively concentrated sodium hydrosulphide solution.

14. The method for producing sodium hydrosulphide which comprises forming an aqueous $Na_2CO_3$ solution containing substantially no sodium salt other than $Na_2CO_3$ and having an $Na_2CO_3$ concentration not less than 10% and not more than 21% by weight, contacting said solution with $H_2S$ gas while maintaining temperature not less than 100° C., and regulating the contacting operation so as (1) to prevent, during the course thereof, increase of the "total sodium salt content" of the solution undergoing $H_2S$ gassing to more than 21% by weight, and (2) to form a sodium hydrosulphide solution containing not less than 5% by weight of NaHS and not more than 14% by weight of $NaHCO_3$; raising the $Na_2CO_3$ concentration of said sodium hydrosulphide solution and increasing the "total sodium salt content" thereof to not more than 29% by weight while maintaining NaHS content of the solution not less than 5% and $NaHCO_3$ content not more than 14% by weight; contacting the resulting solution with gas containing $H_2S$ and an amount of $CO_2$ ranging from none to a volume equal to the volume of the $H_2S$ content of said gas by maintaining temperature not less than 100° C., and regulating said second mentioned contacting operation so as to prevent, during the course thereof, increase of "total sodium salt content" of the solution undergoing $H_2S$ gassing to more than 29% by weight, thereby forming relatively concentrated sodium hydrosulphide solution.

15. The method for producing sodium hydrosulphide which comprises forming an aqueous $Na_2CO_3$ solution containing substantially no sodium salt other than $Na_2CO_3$ and having an $Na_2CO_3$ concentration of 18–21% by weight, contacting said solution with gas containing $H_2S$ and an amount of $CO_2$ ranging from none to a volume equal to the volume of the $H_2S$ content of said gas while maintaining temperature of 100–125° C. and pressure such as to prevent any substantial boiling of said solution, continuing said contacting operation until the sodium hydrosulphide solution formed contains not less than 8% by weight of NaHS and not more than 10% by weight of $NaHCO_3$; adding dry $Na_2CO_3$ to said sodium hydrosulphide solution to increase the "total sodium salt content" thereof to not more than 29% by weight while maintaining NaHS content of the solution not less than 8% and $NaHCO_3$ content not more than 10% by weight; and contacting the resulting solution with $H_2S$ under temperature, pressure and $H_2S$ gas composition conditions above stated in connection with the first mentioned contacting operation, thereby forming relatively concentrated sodium hydrosulphide solution.

ARTHUR W. SADDINGTON.